United States Patent
Kögel et al.

(10) Patent No.: US 6,515,873 B2
(45) Date of Patent: Feb. 4, 2003

(54) SWITCHED-MODE POWER SUPPLY

(75) Inventors: Reinhard Kögel, Brigachtal (DE); Jean-Paul Louvel, Villingen-Schwenningen (DE)

(73) Assignee: Thomson Licensing, S.A., Boulogne-Billancourt (FR)

(*) Notice: Subject to any disclaimer, the term of this patent is extended or adjusted under 35 U.S.C. 154(b) by 0 days.

(21) Appl. No.: 09/933,850

(22) Filed: Aug. 21, 2001

(65) Prior Publication Data

US 2002/0034084 A1 Mar. 21, 2002

(30) Foreign Application Priority Data

Aug. 24, 2000 (DE) .......................... 100 41 475

(51) Int. Cl.⁷ ............................................. H02M 3/335
(52) U.S. Cl. ...................................... 363/20; 363/56.01
(58) Field of Search ........................ 363/16, 20, 56.01, 363/131; 323/255, 340

(56) References Cited

U.S. PATENT DOCUMENTS

| | | | |
|---|---|---|---|
| 4,802,080 A | * | 1/1989 | Bossi et al. .................... 363/75 |
| 6,018,469 A | * | 1/2000 | Poon ............................. 363/20 |
| 6,052,290 A | * | 4/2000 | Moreau .......................... 363/20 |
| 6,088,242 A | * | 7/2000 | Koegel et al. ................. 363/21 |

* cited by examiner

Primary Examiner—Adolf Deneke Berhane
(74) Attorney, Agent, or Firm—Joseph S. Tripoli; Joseph J. Laks; Daniel E. Sragow

(57) ABSTRACT

A switched-mode power supply has a storage capacitor, a transformer with a primary winding and at least one secondary winding, and also a switching transistor which is connected in series with the primary winding. The primary winding is subdivided into sub-windings with at least one tap. A capacitance is disposed in parallel with each sub-winding, as a damping network. The numbers of windings of the sub-windings and the values of the capacitors disposed in parallel with the sub-windings are selected in such a way that the oscillations occurring when the switching transistor becomes blocked have different resonant frequencies and thereby partially cancel each other. This results in an effective damping of the resonant voltage over the switching transistor. Since the capacitors are connected in series, the effective total capacitance is low, so that the resulting discharge current at the time when the switching transistor becomes conductive is comparably low.

8 Claims, 2 Drawing Sheets

SWITCHED-MODE POWER SUPPLY

BACKGROUND

The invention is based on a switched-mode power supply with a storage capacitor, a transformer with a primary winding and a secondary winding, and with a switching transistor, which is connected in series with the primary winding. Switched-mode power supplies of this type are used in particular as flyback converters in entertainment electronics equipment, for example in television sets and video recorders.

The switching transistor used in a switched-mode power supply of this type is used in a switching mode with the shortest possible switching and blocking times, in order to minimize the losses in the switching transistor. The resulting current interruptions at the blocking time, the high di/dt caused thereby and the inductances of the transformer at the beginning of the blocking phase of the switched-mode power supply produce a high-voltage peak over the switching transistor which significantly exceeds the steady-state voltage value defined by the storage capacitor. If the switched-mode power supply is operated on the 230-volt AC system, voltage peaks up to 1000 V may thus occur, representing a risk to the switching transistor, or the latter must be designed accordingly for this voltage range.

For this purpose, it is known for a damping network, also referred to as a snubber network, to be provided, which at least partially suppresses these voltage peaks. A frequently used damping network of this type is, for example, known from DE 40 29 221 A1. Here, a network, comprising a capacitor connected in series with a diode, with which a resistor is connected in parallel, is disposed in parallel with the primary winding of the transformer. By means of this damping network, the voltage peak occurring on the switching transistor is at least partially suppressed by the capacitor, or is stored and subsequently fed off via the diode to the storage capacitor, or is consumed via the resistor when the capacitor is discharged.

In smaller switched-mode power supplies, it is also known for only one capacitor, connected in parallel with the primary winding, to be used as the damping network. However, this circuit variant produces a higher current loading of the switching transistor at the activation time. Further circuit variants for damping voltage peaks are known, for example, from EPA-A-0 279 335.

The object of the invention is to provide a damping network for a switched-mode power supply of the type mentioned at the beginning, which has only a few components and produces low losses in the switched-mode power supply.

The switched-mode power supply according to the invention has a storage capacitor, a transformer with a primary winding and at least one secondary winding, and also a switching transistor, which is connected in series with the primary winding. The primary winding is subdivided into sub-windings with at least one tap, and, as the damping network, a capacitor is in each case disposed in parallel with a sub-winding, preferably with each sub-winding. By means of this measure, the sub-windings of a primary winding are individually damped, and not the entire primary winding as such.

The numbers of windings of the sub-windings and the capacitances of the capacitors disposed in parallel with the sub-windings are advantageously selected in such a way that the oscillations produced when the switching transistor becomes non-conductive have different resonant frequencies and thereby at least partially cancel each other. This results in an effective damping of the voltage across the switching transistor when it becomes non-conductive. However, since the capacitors are connected in series here, the resulting total capacitance is small, so that the discharge current concerned is comparatively low at the time of conduction of the switching transistor.

A "chamber transformer" in particular can be used as the transformer, of the type known, for example, from EP-A-0 071 008, in which the primary winding is subdivided into sub-windings which are disposed in individual chambers of a coil shell, whereby a tap can be fed off to each sub-winding with no significant increase in cost.

BRIEF DESCRIPTION OF THE DRAWING

The invention is explained in more detail below with reference to examples and a schematic drawing, in which.

DETAILED DESCRIPTION OF PREFERRED EMBODIMENTS

Figure 1:
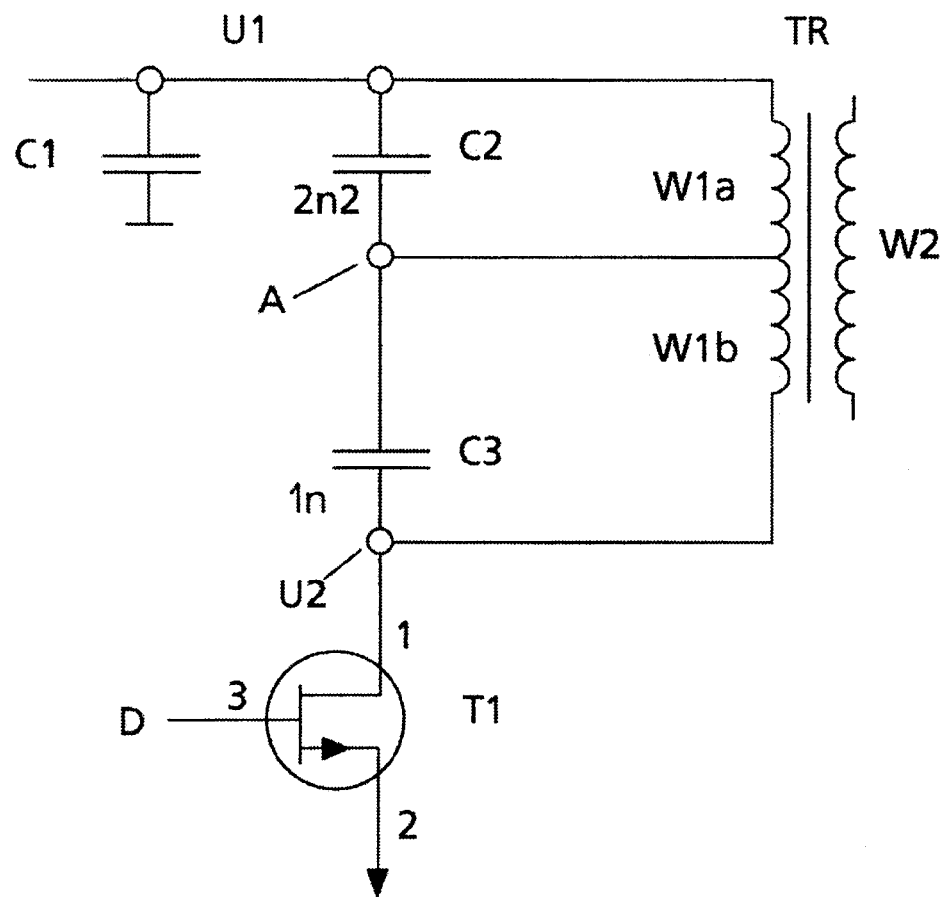
FIG. 1 shows a simplified circuit diagram of a switched-mode power supply according to the flyback conversion principle.

The switched-mode power supply according to FIG. 1 has a storage capacitor C1, which is connected to a primary winding of a transformer TR and whose voltage U1 or charge provides the required power for the switched-mode power supply. The primary winding which is connected in series with the power connections 1 and 2 of a switching transistor T1 is subdivided here into two sub-windings W1*a* and W1*b* and has a tap A between the two sub-windings W1*a* and W1*b*. A capacitor C2 or C3 is connected in each case in parallel with these two sub-windings W1*a*, W1*b* as a damping network.

The transformer TR has a winding W2 on the secondary side to supply a consumer; in practical embodiments, it normally contains further secondary windings and auxiliary windings on the primary side for the operation of the switched-mode power supply. If the switched-mode power supply is operated on the 230 V mains system, it is designed with mains isolation. Here, the storage capacitor C1 is connected via a rectifier to the mains system to supply power to the switched-mode power supply. However, the switched-mode power supply may also be provided with a transformer without mains isolation, for example using a DC-DC converter in conjunction with a battery.

The transformer TR is in particular a chamber transformer, as known from EP-A-0 071 008, whose primary winding and secondary winding are subdivided into a plurality of sub-windings, which are located in chambers of a chamber coil shell, the sub-windings on the primary side and the secondary side being interleaved. In this embodiment, the capacitances of the capacitors C2, C3 are 2.2 nF and 1 nF.

In the embodiment shown in FIG. 1, the switching transistor T1 operates as a flyback converter and is controlled in a known manner via a control connection 3 by a driver stage D. Here, the switching transistor T1 is in particular an MOSFET.

Here, the capacitors C2 and C3 of the damping network, along with the relevant sub-windings W1*a*, W1*b*, form oscillation-capable systems which are independent of one another and which are excited when the switching transistor T1 is blocked. Since the switching transistor T1 draws a corresponding current in the conductive phase via the primary winding W1a, W1b from the storage capacitor C1, the capacitors C2 and C3 are charged when the switching transistor T1 is blocked by the inductances of the relevant sub-windings W1a and W1b. The voltage present on the input 1 of the switching transistor T1 is thus derived from the addition of the voltages delivered via the capacitors C2 and C3 in relation to the voltage U1 via the storage capacitor C1. The two resonances of the damping network are selected here in such a way that the oscillations cancel each other out, for example, if the ratio of the resonant frequencies is 1:3, so that effective oscillation damping is guaranteed. Since the capacitors C2 and C3 are connected in series, the total capacitance of the damping network is relatively low, so that the discharge current is also relatively low at the time when the transistor T1 becomes conductive.

Figure 2:
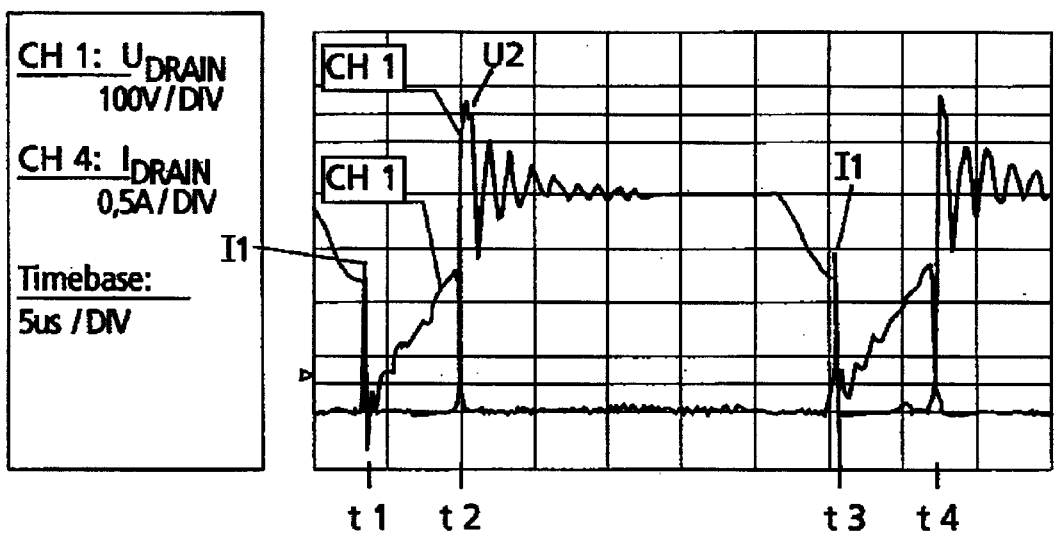
FIG. 2 shows a voltage and current diagram of a switched-mode power supply according to FIG. 1.

The response of the damping network will now be described in detail with reference to current and voltage diagrams as shown in FIG. 2. Here, channel 1, CH1, shows the voltage U2 present on the drain connection 1 of the switching transistor T1, and channel 4, CH4, shows the current through the switching transistor in normal operation of the switched-mode power supply. The switching transistor is in each case switched conductive at times t1 and t3 and is in each case blocked at times t2 and t4.

At times t1 and t3, a corresponding current surge I1 occurs when the switching transistor T1 is activated through the discharge of the two capacitors C2 and C3 (see channel CH4). The current through the switching transistor then increases continuously, according to the inductance of the transformer TR. At times t2 and t4, when the switching transistor is blocked, the current in each case decreases to zero. The voltage U2 accordingly rises sharply at times t2 and t4 and then slowly dies away. In the first peak, a glitch is clearly evident, caused by the different resonant frequencies. The peak is relatively small and represents no risk to the switching transistor. A type with a correspondingly low dielectric strength can therefore be selected as the switched-mode power supply.

Figure 3:
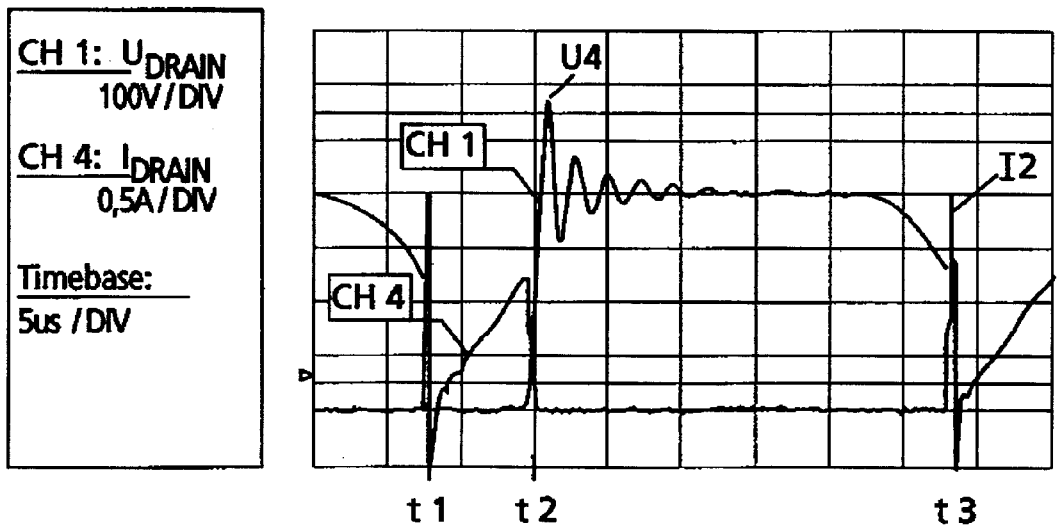
FIG. 3 shows a voltage and current diagram of a switched-mode power supply with only one capacitor connected in parallel with the primary winding according to the state of the art.

Corresponding current and voltage ratios are shown in FIG. 3 for a damping network which has only one capacitor connected in parallel with the primary winding, as known according to the state of the art. Here, the capacitor has a capacitance of 2.2 nF. Here, the voltage peak U4 is comparable in level to the voltage peak U1, the current surge I2 at the time when the switching transistor is activated, t1 and t3, but is considerably higher and in particular considerably broader. This would result in a high heat load on the switching transistor, since the switching transistor is not yet fully switched during this time period and therefore a substantial voltage is still present on the current connection 1 of the switching transistor, so that the current-voltage product would be comparably high.

An effective damping network can therefore already be indicated with one primary winding, which is subdivided into only two sub-windings, and an additional capacitor. In particular, no resistor is required to discharge a capacitor, which must normally be designed for a higher power loss.

The switched-mode power supply in FIG. 1 has a transformer with two sub-windings, and also two parallel-connected capacitors, but it can also be used accordingly with a transformer with more than two sub-windings. With two sub-windings, it is suitable in particular as a flyback converter with a power range below 100 watts, with an MOSFET as the switching transistor.

What is claimed is:

1. Switched-mode power supply operating as a flyback converter, comprising
   a transformer with a primary winding and a secondary winding,
   a storage capacitor being coupled to said primary winding, and
   a switching transistor being connected in series with said primary winding,
   said primary winding being coupled between said storage capacitor and said switching transistor and being subdivided into at least two sub-windings, and
   first and second capacitors each being respectively connected in parallel with said first and second sub-windings for damping of oscillations, when said switching transistor becomes non-conductive.

2. Switched-mode power supply according to claim 1, characterized in that the values of said two capacitors and the numbers of windings of said two sub-windings are selected such that said oscillations have different resonant frequencies, and that the first maximum of one oscillation coincides with a minimum of the second oscillation.

3. Switched-mode power supply according to claim 1, characterized in that said first capacitor is connected to the switching transistor and the second capacitor is connected to the storage capacitor, the value of said first capacitor is smaller than the value of the second capacitor.

4. Switched-mode power supply according to claim 2, characterized in that the values of said first and second capacitors and the numbers of windings of said two sub-windings are selected in such a way that the ratio of the resonant frequencies is about 1:3.

5. Switched-mode power supply according to claim 1, characterized in that the transformer is a chamber transformer whose sub-windings on the primary side are fed out with a tap.

6. Switched-mode power supply according to claim 1, characterized in that said switching transistor is a MOSFET.

7. Switched-mode power supply comprising
   a transformer with a primary winding and a secondary winding,
   a storage capacitor being coupled to a first terminal of said primary winding, and
   a switching transistor being coupled to a second terminal of said primary winding
   said switching transistor being connected in series with said primary winding,
   said primary winding being coupled between said storage capacitor and said switching transistor and being subdivided into first and second sub-windings with a tap, and
   first and second capacitors respectively coupled in parallel with said first and second sub-windings for a damping of oscillations.

8. Switched-mode power supply comprising
   a transformer with a primary winding and a secondary winding,
   a storage capacitor being coupled to said primary winding, and
   a switching transistor being connected in series with said primary winding,
   said primary winding being coupled between said storage capacitor and said switching transistor and being subdivided into at least first and second sub-windings, and
   first and second capacitors each respectively coupled to said sub-windings for a damping of oscillations, said capacitors being connected in series.

* * * * *